(12) United States Patent
Sumi et al.

(10) Patent No.: US 7,790,794 B2
(45) Date of Patent: Sep. 7, 2010

(54) COMPOSITION FOR AQUEOUS COATING MATERIAL AND PROCESS FOR ITS PRODUCTION, AND TWO-COMPONENT CURABLE AQUEOUS COATING MATERIAL KIT

(75) Inventors: Naoko Sumi, Chiyoda-ku (JP); Takashi Morizumi, Chiyoda-ku (JP); Isao Kimura, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/248,129

(22) Filed: Oct. 9, 2008

(65) Prior Publication Data
US 2009/0048391 A1    Feb. 19, 2009

Related U.S. Application Data

(63) Continuation of application No. PCT/JP2007/058977, filed on Apr. 25, 2007.

(30) Foreign Application Priority Data

| Apr. 25, 2006 | (JP) | ............................. 2006-120464 |
| Feb. 6, 2007 | (JP) | ............................. 2007-027081 |

(51) Int. Cl.
*C08K 5/07* (2006.01)

(52) U.S. Cl. .................. 524/361; 524/544; 524/545; 524/546; 524/555; 524/558; 524/559; 525/386; 106/287.28

(58) Field of Classification Search ................. 524/544, 524/545
See application file for complete search history.

(56) References Cited

U.S. PATENT DOCUMENTS

| 4,952,653 | A | * | 8/1990 | Tomihashi et al. | .......... 526/249 |
| 5,242,972 | A | * | 9/1993 | Negishi et al. | .............. 524/545 |
| 5,447,982 | A | * | 9/1995 | Kamba et al. | ................ 524/458 |

FOREIGN PATENT DOCUMENTS

| EP | 0 212 508 A2 | 3/1987 |
| EP | 0 224 870 A2 | 6/1987 |
| EP | 1 593 720 A1 | 11/2005 |
| JP | 1-29488 | 6/1989 |
| JP | 2-70706 | 3/1990 |
| JP | 5-117578 | 5/1993 |
| JP | 5-179191 | 7/1993 |
| JP | 3356803 | 10/2002 |
| WO | 01-44390 | 6/2001 |

* cited by examiner

*Primary Examiner*—Mark Eashoo
*Assistant Examiner*—Nicole M Buie-Hatcher
(74) *Attorney, Agent, or Firm*—Oblon, Spivak, McClelland, Maier & Neustadt, L.L.P.

(57) ABSTRACT

A composition for aqueous coating material which has a low content of an organic solvent and presents little burden on the environment and which is excellent in storage stability. A composition for aqueous coating material, which comprises a synthetic resin containing a fluorinated copolymer comprising from 40 to 60 mol % of a fluoro-olefin unit, from 3 to 50 mol % of an alkyl vinyl ether or alkyl vinyl ester unit, from 4 to 30 mol % of a hydroxyl group-containing vinyl ether unit and 0.4 to 7 mol % of a structural unit of the following formula

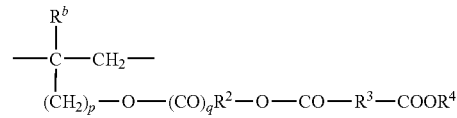

19 Claims, No Drawings

COMPOSITION FOR AQUEOUS COATING MATERIAL AND PROCESS FOR ITS PRODUCTION, AND TWO-COMPONENT CURABLE AQUEOUS COATING MATERIAL KIT

TECHNICAL FIELD

The present invention relates to a composition for aqueous coating material containing a crosslinkable fluorinated copolymer and a process for its production, and a two-component curable aqueous coating material kit.

BACKGROUND ART

In recent years, for protection of natural environment, environmental pollution such as photochemical smog or global warming due to discharge of organic solvents, has been taken up as a problem, and discharge regulation or emission control is being implemented. Particularly in Europe, such control is advanced, and also in Japan, Air Pollution Control Law was revised in 2006, and legal discharge regulations were implemented.

In order to meet such legal regulations, also in the field of coating materials, efforts have been made to develop a coating method to increase the coating efficiency to effectively utilize a coating material or to introduce a high solid type coating material by increasing the solid content in a coating material thereby to reduce a solvent to be discharged. However, with such a high solid type coating material, there is a limit in reduction of the solvent.

Heretofore, compositions for aqueous coating materials have been known wherein various synthetic resins of e.g. alkyd type, acryl type, polyester type, polyvinyl acetate type or epoxy type, are dispersed or dissolved in water. An aqueous coating composition employing a crosslinkable fluorinated copolymer having hydroxyl groups, as such a synthetic resin or as a part of such a synthetic resin, is widely known, since it is excellent in weather resistance.

As a fluorinated copolymer to be used for a composition for aqueous coating material, one having some of hydroxyl groups esterified to introduce carboxyl groups in an organic solvent and further having some or all of such carboxyl groups neutralized by a basic compound, in order to increase the affinity to water, is known (Patent Document 1).

Further, a fluorinated copolymer obtained by emulsion polymerization is also known (Patent Document 2). However, in the aqueous dispersion or aqueous solution of the fluorinated copolymer in Patent Document 1, a large amount of an organic solvent used in the step of introducing carboxyl groups will remain. Further, if the remaining organic solvent is removed, the storage stability tends to deteriorate, and sedimentation tends to take place as the time passes.

On the other hand, in a case where a fluorinated copolymer obtained by emulsion polymerization is used as in Patent Document 2, an emulsion coating material having a low solvent concentration can be obtained. However, the emulsion coating material has had a problem that the film-forming property is poor, or due to the remaining emulsifier, the water resistance or adhesion tends to be poor.

Patent Document 1: JP-B-1-29488

Patent Document 2: Japanese Patent No. 3,356,803

DISCLOSURE OF THE INVENTION

Object to be Accomplished by the Invention

The present invention has been made under the above-mentioned circumstances and is to provide a composition for aqueous coating material containing a crosslinkable fluorinated copolymer, which is excellent in storage stability even when the content of an organic solvent is low. Further, it is to provide a process for producing such a composition for aqueous coating material and a two-component curable aqueous coating material kit.

Means to Accomplish the Object

In order to accomplish the above object, the present invention provides the following:

(1) A composition for aqueous coating material, which comprises water and a synthetic resin dispersed or dissolved therein, wherein the synthetic resin contains a fluorinated copolymer (A) comprising from 40 to 60 mol % of a structural unit of the formula (a1), from 3 to 50 mol % of a structural unit of the formula (a2), from 4 to 30 mol % of a structural unit of the formula (a3) and 0.4 to 7 mol % of a structural unit of the formula (a4) (provided that the total mol % value of the respective structural units of the formulae (a1), (a2), (a3) and (a4) is from 80 to 100); and which contains no solvent or a solvent in an amount of at most 10 mass % in the total mass of the composition for aqueous coating material:

Formula (a1)

(provided that in the formula (a1), each of $X^1$ and $X^2$ which are independent of each other, is a hydrogen atom, a chlorine atom or a fluorine atom, and $X^3$ is a chlorine atom, a fluorine atom or $-CY^1Y^2Y^3$, wherein each of $Y^1$, $Y^2$ and $Y^3$ which are independent of one another, is a hydrogen atom, a chlorine atom or a fluorine atom);

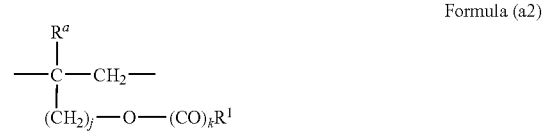

Formula (a2)

(provided that in the formula (a2), $R^a$ is a hydrogen atom or a methyl group, $R^1$ is a $C_{1-12}$ alkyl group or a $C_{4-10}$ monovalent alicyclic group, j is an integer of from 0 to 8, and k is 0 or 1);

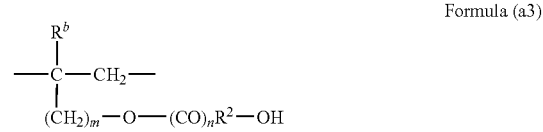

Formula (a3)

(provided that in the formula (a3), $R^b$ is a hydrogen atom or a methyl group, $R^2$ is a $C_{1-10}$ alkylene group or a $C_{4-10}$ bivalent alicyclic group, m is an integer of from 0 to 8, and n is 0 or 1); and Formula (a4)

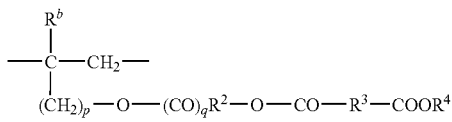

(provided that in the formula (a4), $R^b$ and $R^2$ are as defined in the formula (a3), respectively, $R^3$ is a $C_{2-10}$ alkylene group or a $C_{4-10}$ bivalent alicyclic group, $R^4$ is a hydrogen atom or —$NHZ^1Z^2Z^3$, wherein each of $Z^1$, $Z^2$ and $Z^3$ which are independent of one another, is a hydrogen atom, a $C_{1-4}$ alkyl group or a $C_{1-6}$ hydroxyalkyl group, provided that at least a part of $R^4$ is required to be —$NHZ^1Z^2Z^3$, p is an integer of from 0 to 8, and q is 0 or 1).

(2) A process for producing a composition for aqueous coating material, which comprises:

an esterification step of reacting a fluorinated copolymer (B) comprising from 40 to 60 mol % of a structural unit of the formula (a1), from 3 to 50 mol % of a structural unit of the formula (a2) and from 4.4 to 37 mol % of a structural unit of the formula (a3) (provided that the total mol % value of the respective structural units of the formulae (a1), (a2) and (a3) is from 80 to 100) with a dibasic acid anhydride in an organic solvent to esterify a part of the hydroxyl group in the structural unit of the formula (a3) to introduce a carboxyl group;

a neutralizing step of adding a basic compound to neutralize at least a part of the carboxyl group with the basic compound;

a step of adding water; and a step of removing the organic solvent:

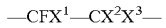  Formula (a1)

(provided that in the formula (a1), each of $X^1$ and $X^2$ which are independent of each other, is a hydrogen atom, a chlorine atom or a fluorine atom, and $X^3$ is a chlorine atom, a fluorine atom or —$CY^1Y^2Y^3$, wherein each of $Y^1$, $Y^2$ and $Y^3$ which are independent of one another, is a hydrogen atom, a chlorine atom or a fluorine atom);

Formula (a2)

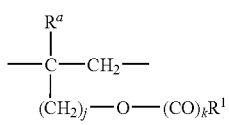

(provided that in the formula (a2), $R^a$ is a hydrogen atom or a methyl group, $R^1$ is a $C_{1-12}$ alkyl group or a $C_{4-10}$ monovalent alicyclic group, j is an integer of from 0 to 8, and k is 0 or 1); and Formula (a3)

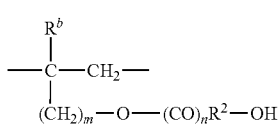

(provided that in the formula (a3), $R^b$ is a hydrogen atom or a methyl group, $R^2$ is a $C_{1-10}$ alkylene group or a $C_{4-10}$ bivalent alicyclic group, m is an integer of from 0 to 8, and n is 0 or 1).

(3) The process for producing a composition for aqueous coating material according to the above (2), wherein the neutralizing step and the step of adding water are conducted at the same time by adding an aqueous solution of the basic compound.

(4) A two-component curable aqueous coating material kit which comprises the composition for aqueous coating material as defined in the above (1) and a water-soluble is or water-dispersible curing agent.

(5) The composition for aqueous coating material according to the above (1), wherein the structural unit of the formula (a2) is a structural unit wherein j=k=0, and the structural unit of the formula (a3) is a structural unit wherein m=n=0.

(6) The composition for aqueous coating material according to the above (1) or (5), wherein the organic solvent is at least one member selected from the group consisting of alcohols, cellosolves, propylene glycol derivatives and ketones.

(7) The composition for aqueous coating material according to the above (1), (5) or (6), which contains the organic solvent in an amount of at most 3 mass % in the total mass of the composition for aqueous coating material.

(8) The composition for aqueous coating material according to the above (1), (5), (6) or (7), wherein the content of the structural unit of the formula (a4) in the fluorinated copolymer is from 1.4 to 6 mol %.

(9) The two-component curable aqueous coating material kit according to the above (4), wherein the water-soluble or water-dispersible curing agent is an isocyanate compound.

(10) The two-component curable aqueous coating material kit according to the above (4), wherein the water-soluble or water-dispersible curing agent is a non-blocked isocyanate.

EFFECTS OF THE INVENTION

The composition for aqueous coating material of the present invention has a low content of an organic solvent and presents little burden on the environment. Further, in spite of the low content of an organic solvent, it is excellent in storage stability.

Further, by the process for producing a composition for aqueous coating material of the present invention, it is possible to produce a composition for aqueous coating material which has a low content of an organic solvent and presents little burden on the environment and which is excellent in storage stability.

Further, the two-component curable aqueous coating material kit of the present invention employs the composition for aqueous coating material excellent in storage stability in spite of the low content of an organic solvent, and thus, it presents little burden on the environment and is excellent in the handling efficiency.

BEST MODE FOR CARRYING OUT THE INVENTION

Composition for Aqueous Coating Material
Fluorinated Copolymer A

The composition for aqueous coating material of the present invention is an aqueous coating composition having a synthetic resin dispersed or dissolved in water, wherein the synthetic resin contains a fluorinated copolymer (A).

The fluorinated copolymer (A) comprises a structural unit of the formula (a1), a structural unit of the formula (a2), a structural unit of the formula (a3) and a structural unit of the formula (a4). The total mol % value of the respective structural units of the formulae (a1), (a2), (a3) and (a4) is from 80 to 100, preferably from 95 to 100.

Further, in the present specification, the structural unit of the formula (a1) may also be shown as "a structural unit (a1)." The same applies to compounds represented by other formulae.

The structural unit (a1) is a structural unit of the following formula (a1) derived from a fluoroolefin type compound.

$$—CFX^1—CX^2X^3— \quad \text{(a1)}$$

Further, in the formula (a1), each of $X^1$ and $X^2$ which are independent of each other, is a hydrogen atom, a chlorine atom or a fluorine atom, and $X^3$ is a chlorine atom, a fluorine atom or $—CY^1Y^2Y^3$, (wherein each of $Y^1$, $Y^2$ and $Y^3$ which are independent of one another, is a hydrogen atom, a chlorine atom or a fluorine atom).

As the structural unit (a1), it is possible to mention a structural unit derived from the following fluoroolefin type compound:

A fluoroethylene such as $CF_2=CF_2$, $CClF=CF_2$, $CHCl=CF_2$, $CCl_2=CF_2$, $CClF=CClF$, $CHF=CCl_2$, $CH_2=CClF$ or $CCl_2=CClF$; a fluoropropene such as $CF_2ClCF=CF_2$, $CF_3CCl=CF_2$, $CF_3CF=CFCl$, $CF_2ClCCl=CF_2$, $CF_2ClCF=CFCl$, $CFCl_2CF=CF_2$, $CF_3CCl=CClF$, $CF_3CCl=CCl_2$, $CClF_2CF=CCl_2$, $CCl_3CF=CF_2$, $CF_2ClCCl=CCl_2$, $CFCl_2CCl=CCl_2$, $CF_3CF=CHCl$, $CClF_2CF=CHCl$, $CH_3CCl=CHCl$, $CHF_2CCl=CCl_2$, $CF_2ClCH=CCl_2$, $CF_2ClCCl=CHCl$, $CCl_3CF=CHCl$ or $CH_2BrCF=CCl_2$; or a fluoroolefin type compound having at least 4 carbon atoms such as $CF_3CCl=CFCF_3$, $CF_2=CFCF_2CClF_2$ or $CF_3CF_2CF=CCl_2$.

Among them, $CF_2=CF_2$ or $CClF=CF_2$ is preferred since the weather resistance of a coated film is excellent.

The content of the structural unit (a1) in the fluorinated copolymer (A) is from 40 to 60 mol %, preferably from 45 to 55 mol %.

When the content of the structural unit (a1) is in the above range, the sufficient weather resistance will be obtained, and the glass transition temperature of a polymer will not be too high, whereby it is possible to obtain an amorphous good film.

The structural unit (a2) is a structural unit of the following formula (a2) derived from e.g. an alkyl vinyl ether, alkyl vinyl ester, alkyl allyl ether or alkyl allyl ester.

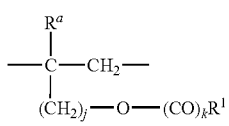

Formula (a2)

Here, in the formula (a2), $R^a$ is a hydrogen atom or a methyl group, $R^1$ is a $C_{1-12}$ alkyl group or a $C_{4-10}$ monovalent alicyclic group, j is an integer of from 0 to 8, and k is 0 or 1.

The structural unit of the formula (a2) is preferably an alkyl vinyl ether or alkyl vinyl ester, wherein j=0, and k=0 or 1.

The structural unit (a2) may, for example, be a structural unit derived from ethyl vinyl ether, n-butyl vinyl ether, cyclohexyl vinyl ether, vinyl acetate, vinyl valerate or vinyl pivalate, and among them, a structural unit is properly selected depending upon the desired coated film physical properties (hardness, gloss, pigment dispersibility, etc.).

Among them, a structural unit derived from ethyl vinyl ether or cyclohexyl vinyl ether is preferred since the alternating copolymerizability with the structural unit (a1) is good, and it is easy to adjust the glass transition temperature of the resin.

The content of the structural unit (a2) is from 3 to 50 mol %, preferably from 20 to 45 mol %, based on the total structural units of the fluorinated copolymer (A). In the present invention, it is possible to use two or more types of the structural unit (a2).

The structural unit (a3) is a structural unit of the following formula (a3) derived from a hydroxyl group-containing vinyl ether, a hydroxyl group-containing vinyl ester, a hydroxyl group-containing allyl ether or a hydroxyl group-containing allyl ester.

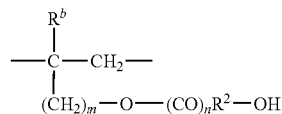

Formula (a3)

Here, in the formula (a3), $R^b$ is a hydrogen atom or a methyl group, $R^2$ is a $C_{1-10}$ alkylene group or a $C_{4-10}$ bivalent alicyclic group, m is an integer of from 0 to 8, and n is 0 or 1.

The structural unit (a3) may, for example, be a structural unit derived from 2-hydroxyalkyl vinyl ether, 4-hydroxybutyl vinyl ether, 1-hydroxymethyl-4-vinyloxy methylcyclohexane or 4-hydroxybutyl vinyl ester, and among them, a structural unit derived from a hydroxyalkyl vinyl ether is preferred from the viewpoint of polymerizability, crosslinking property, etc.

The content of the structural unit (a3) in the fluorinated copolymer (A) is from 4 to 30 mol %, preferably from 8 to 25 mol %.

If the content of the structural unit (a3) is too small, the crosslink density will be low when a crosslinking reaction is carried out. Further, if the content of the structural unit (a3) is too large, there is a concern that the water resistance of a coated film will decrease.

The structural unit (a4) is a structural unit of the following formula (a4).

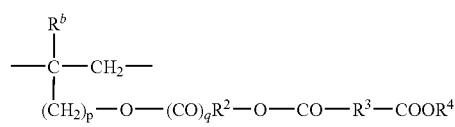

Formula (a4)

Here, in the formula (a4), $R^b$ and $R^2$ are as defined in the formula (a3), respectively, $R^3$ is a $C_{2-10}$ alkylene group or a $C_{4-10}$ bivalent alicyclic group, $R^4$ is a hydrogen atom or $—NHZ^1Z^2Z^3$, wherein each of $Z^1$, $Z^2$ and $Z^3$ which are independent of one another, is a hydrogen atom, a $C_{1-4}$ alkyl group or a $C_{1-6}$ hydroxyalkyl group, provided that at least a part of $R^4$ is required to be $—NHZ^1Z^2Z^3$, p is an integer of from 0 to 8, and q is 0 or 1.

In the structural unit (a4), the proportion of $R^4$ being $—NHZ^1Z^2Z^3$ is preferably from 30 to 100 mol %, more preferably from 50 to 100 mol %.

The content of the structural unit (a4) in the fluorinated copolymer (A) is from 0.4 to 7 mol %, preferably from 1.4 to 6 mol %.

When the content of the structural unit (a4) is in the above range, the solubility or dispersibility in water will be excellent, and the stability in water will be excellent.

The fluorinated copolymer (A) in the present invention may contain at most 20 mol % of a structural unit (hereinafter referred to as another structural unit) other than the structural units (a1), (a2), (a3) and (a4).

Such another structural unit may, for example, be a structural unit derived from an ethylenic monomer.

The particularly preferred structure of the fluorinated copolymer (A) is a structure comprising from 45 to 55 mol % of the structural unit (a1), from 14 to 45.6 mol % of the structural unit (a2), from 8 to 25 mol % of the structural unit (a3), from 1.4 to 6 mol % of the structural unit (a4) and no another structural unit.

Another Synthetic Resin Component

In the composition for aqueous coating material of the present invention, a synthetic resin other than the fluorinated copolymer (A) may be dispersed or dissolved in water together with the fluorinated copolymer (A). Such another synthetic resin may be a synthetic resin of e.g. a fluorine type, a phenol type, an alkyd type, a melamine type, a urea type, a vinyl type, an epoxy type, a polyester type, a polyurethane type or an acryl type.

The fluorine type synthetic resin may, for example, be a fluorinated copolymer having, as essential structural components, polymerized units derived from fluoroolefin described in Japanese Patent No. 2955336 and polymerized units derived from a macromonomer having a hydrophilic moiety. Here, the hydrophilic moiety means a moiety having a hydrophilic group, a moiety having a hydrophilic bond or a moiety made of a combination thereof. Further, the macromonomer is a polymer or oligomer having a low molecular weight and having a radical polymerizable unsaturated group on its one end. When such a fluorinated copolymer is contained in the composition, the mechanical stability and chemical stability of the aqueous coating material composition will be improved, such being preferred.

In the composition for aqueous coating material of the present invention, the proportion of the fluorinated copolymer (A) in the synthetic resin dispersed or dissolved in water is preferably from 10 to 95 mass %, more preferably from 50 to 90 mass %.

When other than the fluorine type synthetic resin is used as the synthetic resin other than the fluorinated copolymer (A), it is preferred to adjust the proportion of the fluorinated copolymer (A) to be at least 55 mass % from a viewpoint such that excellent weather resistance will be imparted.

In the composition for aqueous coating material of the present invention, the solid content concentration of the synthetic resin dispersed or dissolved in water is preferably from 3 to 50 mass %, more preferably from 30 to 50 mass %.

The composition for aqueous coating material of the present invention may be one which does not contain an organic solvent or one which contains at most 10 mass %, preferably at most 3 mass %, of the organic solvent in the total mass of the composition for aqueous coating material.

As the organic solvent which may possibly be contained, it is possible to mention, for example, a residue of an organic solvent used for the esterification step which will be described hereinafter. Further, it is also possible to mention a residue of an organic solvent used for the polymerization step of a fluorinated copolymer (B) which will be described hereinafter.

The composition for aqueous coating material of the present invention preferably optionally contains an additive such as a coalescer, a leveling additive, a thickener, an ultraviolet absorber, a light stabilizer or an antifoaming agent.

The coalescer may, for example, be diethylene glycol monoethyl ether acetate, 2,2,4-trimethyl-1,3-pentane diol mono(2-methylpropionate) or diethylene glycol diethyl ether.

The coalescer is one type of the organic solvent in the present invention. Therefore, when the coalescer is incorporated, the sum of the contents of the coalescer and other organic solvents is adjusted to be at most 10 mass % in the composition for aqueous coating material.

When the coalescer is incorporated, its content is preferably at most 3 parts by mass, particularly preferably at most 1 part by mass, per 100 parts by mass of the synthetic resin (the solid content of the polymer).

The leveling additive may, for example, be preferably a polyether-modified polydimethylsiloxane or a polyether-modified siloxane.

The thickener may, for example, be preferably a polyurethane type associative thickener.

As the ultraviolet absorber, it is possible to use various known ones. Particularly, the ultraviolet absorber suitably for use as a transparent coating material for top coating may, for example, be a salicylate such as methyl salicylate, phenyl salicylate, cresyl salicylate or benzyl salicylate; a benzophenone such as 2-hydroxybenzophenone, 2-hydroxy-4-benzyloxy benzophenone, 2-hydroxy-4-octoxy benzophenone, 2-hydroxy-5-chlorobenzophenone, 2-aminobenzophenone or a high molecular weight-modified product sold as T-57 manufactured by Adeka corporation; a benzotriazole such as 2-(2'-hydroxy-5'-t-butylphenyl)benzotriazole, 2-(2'-hydroxy-5'-t-butylphenyl)-5-chlorobenzotriazole, 2-(2'-hydroxy-5'-methoxyphenyl)benzotriazole, 2-(2'-hydroxy-3',5'-di-neopentylphenyl)benzotriazole or a high molecular weight-modified product sold as TINUVIN 900 or 1130 manufactured by Nihon Ciba-Geigy K.K.; a substituted acronitrile such as ethyl 2-cyano-3,3-diphenylacrylate, 2-ethylhexyl 2-cyano-3,3-diphenylacrylate or methyl α-cyano-β-methyl-4-methoxycinnamate; a nickel complex salt such as 2,2'-thiobis(4-octylphenolate) nickel complex salt or [2,2'-thiobis(4-t-octylphenolate)]-n-butylamine-nickel complex salt; an ultraviolet absorber such as dimethyl p-methoxybenzylidene malonate, resorcinol monobenzoic acid ester, hexamethylphosphoric triamide or 2,5-diphenyl-p-benzoquinone; bis(2,2,6,6-tetramethyl-4-piperidine)sebacate and dimethyl succinate/1-(2-hydroxyethyl)-4-hydroxy-2,2,6,6-tetramethylpiperidine polycondensate, or bis(1,2,2,6,6-pentamethyl-4-piperizyl) 2-(3,5-di-t-butyl-4-hydroxybenzyl)-2-n-butylmalonate. They may be used alone or in combination as mixture of two or more of them.

It is preferred to use the ultraviolet absorber in an amount of from 0.1 to 15 parts by mass, particularly preferably from 0.1 to 5 parts by mass, per 100 parts by mass of the solid content concentration of the synthetic resin. If the amount of the ultraviolet absorber is too small, its effect of improving the weather resistance cannot be sufficiently obtained, and if it is too large, its effect is saturated, such being not proper.

The light stabilizer may, for example, be a hindered amine type light stabilizer such as MARK LA 57, 62, 63, 67 or 68, manufactured by Adeka corporation or TINUVIN 622LD manufactured by Nihon Ciba-Geigy K.K. They may be used alone or as a mixture of two or more of them in combination with the ultraviolet absorber.

The antifoaming agent may, for example, be a fatty acid salt, a higher alcohol sulfate, a liquid fatty oil sulfuric acid ester, an aliphatic amine or aliphatic amide sulfate, an aliphatic alcohol phosphoric acid ester, a sulfonate of dibasic fatty acid ester, a fatty acid amide sulfonate, an alkyl allyl sulfonate, a naphthalene sulfonate of formaline condensate, a polyoxyethylene alkyl ether, a polyoxyethylene alkyl phenol ether, a polyoxyethylene alkyl ester, a sorbitan alkyl ester, a polyoxyethylene sorbitan alkyl ester, an acrylic polymer, a silicone mixed acrylic polymer, a vinyl polymer or a polysiloxane compound.

The antifoaming effect is influenced by the balance (HLB value) between hydrophilic groups and hydrophobic groups, and among such antifoaming agents, one having HLB of at most 6, particularly preferably at most 4 is preferably used.

Further, if it is necessary to adjust the gloss of the coated film, a commonly used inorganic or organic delustering agent may simply be added.

Further, if coloring is needed, a coloring material such as a commercially available organic pigment, inorganic pigment, organic dye, or a pigment or dye obtained by complexing them, may be dispersed, or added and mixed.

Process for Producing Composition for Aqueous Coating Material

A process for producing a composition for aqueous coating material of the present invention comprises an esterification step of reacting a fluorinated copolymer (B) with a dibasic acid anhydride in an organic solvent to esterify a part of the hydroxyl group in the structural unit of the formula (a3) to introduce a carboxyl group, a neutralizing step of adding a basic compound to neutralize at least a part of the carboxyl group with the basic compound, a step of adding water, and a solvent-removing step of removing the organic solvent.

Fluorinated Copolymer (B)

A fluorinated copolymer (B) comprises from 40 to 60 mol % of the structural unit (a1), from 3 to 50 mol % of the structural unit (a2) and from 4.4 to 37 mol % of the structural unit (a3) (provided that the total mol % value of the respective structural units of the formulae (a1), (a2) and (a3) is from 80 to 100).

The mol % of the structural unit (a3) in the fluorinated copolymer (B) is equal to the total mol % of the structural units (a3) and (a4) in the fluorinated copolymer (A) contained in the composition for aqueous coating material of the present invention.

It is possible to produce the fluorinated copolymer (B) by copolymerizing a monomer of the formula (b1), a monomer of the formula (b2) and a monomer of the formula (b3), as shown below (hereinafter sometimes referred to as "a monomer (b1)" or the like) under an alkaline condition in the presence or absence of a polymerization catalyst, by applying a polymerization initiating source such as a polymerization initiator or an ionizing radiation. In order to maintain the copolymerization reaction system in an alkaline side, the copolymerization reaction is carried out in the presence of a basic compound.

The monomer (b1) is a compound of the following formula (b1).

$$CFX^1=CX^2X^3 \qquad \text{Formula (b1)}$$

Here, in the formula (b1), each of $X^1$ and $X^2$ means the same as in the above formula (a1).

The monomer (b2) is a monomer of the following formula (b2).

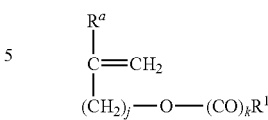

Formula (b2)

Here, in the formula (b2), each of $R^a$, $R^1$, j and k means the same as in the above formula (a2).

The monomer (b3) is a compound of the following formula (b3).

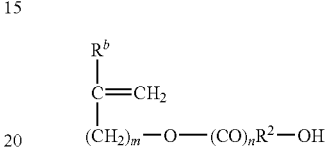

Formula (b3)

Here, in the formula (b3), each of $R^b$, $R^2$, m and n means the same as in the above formula (a3).

The changing proportions (mol %) of the monomer (b1), monomer (b2) and monomer (b3) are the same as the mol % of the structural unit (a1), structural unit (a2) and structural unit (a3), respectively, which constitute the fluorinated copolymer (B).

As the polymerization initiator, a peroxy ester type peroxide such as t-butylperoxyacetate, a dialkylperoxy dicarbonate such as diisopropyl peroxy dicarbonate, benzoyl peroxide, or azobisisobutylonitrile, may, for example, be used.

The amount of the polymerization initiator to be used may suitably be changed depending on the type or copolymerization reaction conditions, but usually, it is used in an amount of from about 0.05 to 0.5 mass % based on the total amount of monomers to be copolymerized.

The amount of the basic compound to be used is from about 0.01 to 20 mass %, preferably from about 0.1 to 10 mass %, based on the total amount of monomers need to be copolymerized.

Further, the basic compound to be present during the polymerization can be selected from a wide range of organic basic compounds and inorganic basic compounds. The organic basic compound is preferably an alkylamine such as triethylamine or an alkylphosphine such as triethylphosphine. The inorganic basic compound is preferably a carbonate, hydroxide or oxide of an alkali metal or an alkaline earth metal such as potassium carbonate, potassium hydroxide, sodium hydroxide or magnesium hydroxide.

For the above copolymerization reaction, it is preferred to use solution polymerization. As a solvent, it is preferred to use an alcohol, an ester, a ketone, a saturated halogenated hydrocarbon containing at least one fluorine atom or an aromatic hydrocarbon such as xylene.

The reaction temperature for the copolymerization reaction is preferably from 10° C. to 90° C. Further, the reaction pressure is preferably from 0 to 100 kg/cm²·G, more preferably from 1 to 50 kg/cm²·G.

The fluorinated copolymer (B) preferably has the intrinsic viscosity of from 0.05 to 2.0 dL/g. By using a reaction solvent having a relatively large chain transfer constant, or by carrying out the reaction in the coexistence of a suitable chain transfer agent, it is possible to suppress the intrinsic viscosity within the above range.

The number average molecular weight of the fluorinated copolymer (B) is preferably in a range of from 3,000 to 200,000. If the molecular weight is less than 3,000, the weather resistance of a coated film will sometimes decrease. If the molecular weight is beyond 200,000, coating property will decrease, and a coated film appearance will sometimes deteriorate.

Esterification Step

In the esterification step, a dibasic acid anhydride is reacted with the fluorinated copolymer (B) in an organic solvent to esterify a part of the hydroxyl group in the structural unit of (a3) to introduce a carboxyl group.

As the dibasic acid anhydride, e.g. succinic anhydride, glutaric anhydride, itaconic anhydride, adipic anhydride, 1,2-cyclohexane dicarboxylic anhydride, cis-4-cyclohexene-1,2-dicarboxylic anhydride, phthalic anhydride, 1,8-naphthalic anhydride or maleic anhydride is preferably used.

The organic solvent may, for example, be an alcohol such as methanol, ethanol, n-propanol, isopropanol, n-butanol, isobutanol, secondary butanol, tertiary butanol or pentanol; a cellosolve such as methyl cellosolve, ethyl cellosolve, isopropyl cellosolve, butyl cellosolve or secondary butyl cellosolve; a propylene glycol derivative such as propylene glycol methyl ether, dipropylene glycol methyl ether or propylene glycol methyl ether acetate; ethylene glycol ethyl ether acetate; a ketone such as acetone, methyl ethyl ketone or methyl isobutyl ketone; or an aromatic compound such as toluene or xylene. It is properly selected by taking solubilities of the fluorinated copolymer (B) and dibasic acid anhydride, etc. into consideration.

Further, if the organic solvent used in the polymerization step for producing the fluorinated copolymer (B) is sufficiently remained, it is not necessary to add an organic solvent additionally in the esterification step.

In the esterification step, it is possible to use a catalyst in combination. As the catalyst, a carboxylic acid metal salt, an alkali hydroxide, an alkali metal carbonate, a quaternary ammonium salt or a tertiary amine may be used, but a tertiary amine such as triethylamine is preferred.

The esterification step is carried out at a reaction temperature of preferably from room temperature to 150° C., more preferably from 50 to 100° C. The reaction time is from several tens minutes to several hours.

The amount of the dibasic acid anhydride to be reacted is determined by adjusting it so that the content of the structural unit (a4) will be from 0.4 to 7 mol % and the content of the structure (a3) will be from 4 to 30 mol % in a fluorinated copolymer (A) to be eventually obtained.

The amount of the structural unit (a4) after the esterification reaction can be ascertained by measuring an acid number. When the acid number after the esterification reaction is from 2 to 35 mgKOH/g, it is possible to ascertain that the structural unit (a4) is in an amount of from 0.4 to 7 mol %.

The amount of the structural unit (a3) before the esterification reaction can be ascertained by a hydroxyl group value before the esterification. In order to have the structural unit (a3) in an amount of from 4 to 30 mol %, it is necessary to have a hydroxyl group value of from 20 to 150 mgKOH/g before the esterification, and an acid number to be in the above range after the esterification.

Neutralizing Step

In the neutralizing step, the basic compound is added to the esterified fluorinated copolymer (B) to neutralize at least a part of the carboxyl group introduced in the esterification step with the basic compound. In the structural unit (a4), the proportion to be neutralized with the basic compound is preferably from 30 to 100 mol %, more preferably from 50 to 100 mol %.

The reaction in the neutralizing step sufficiently proceeds when the basic compound or an aqueous solution of the basic compound is added to an organic solvent wherein the esterified fluorinated copolymer (B) is dissolved, at room temperature with stirring for several tens minutes.

In the neutralizing step, water is added together with the basic compound to the organic solvent wherein the esterified fluorinated copolymer (B) is dissolved. Water can be added simultaneously with the basic compound or separately, and some of it can be added simultaneously, and the rest of it can be added separately. When some or all of the water is added simultaneously, it is preferably added as an aqueous solution of the basic compound. When it is added separately, it can be added before or after adding the basic compound.

Among them, a method of adding water after adding the basic compound and a method of adding an aqueous solution of the basic compound are preferred.

The amount of water to be added in the neutralizing step is preferably adjusted so that the solid content concentration of the esterified fluorinated copolymer (B) becomes from 3 to 50 mass %, particularly from 15 to 35 mass %.

The basic compound to be used in the neutralizing step preferably has a boiling point of at most 200° C. so that the basic compound will hardly remain in a coated film.

The basic compound may, for example, be ammonia; a primary, secondary or tertiary alkylamine such as monomethylamine, dimethylamine, trimethylamine, monoethylamine, diethylamine, triethylamine, monoisopropylamine, diisopropylamine, triisopropylamine, monobutylamine or dibutylamine; an alkanolamine such as monoethanolamine, monoisopropanolamine, dimethylaminoethanol or diethylaminoethanol; a diamine such as ethylene diamine, propylene diamine, tetramethylene diamine or hexamethylene diamine; an alkylene imine such as ethylene imine or propylene imine; piperazine, morpholine, pyrazine or pyridine.

Step of Removing Solvent

In the step of removing the solvent, the organic solvent is removed. Consequently, it is possible to obtain an aqueous coating material composition wherein the organic solvent is at most 10 mass % based on the total mass.

Here, as the solvent to be removed, a residue of an organic solvent used for the esterification step, may be mentioned. Further, a residue of an organic solvent used in the polymerization step for producing the fluorinated copolymer (B), may also be mentioned.

The solvent can be removed by distillation under reduced pressure.

Two-Component Curable Aqueous Coating Material Kit

The two-component curable aqueous coating material kit of the present invention comprises the composition for aqueous coating material of the present invention and a curing agent. The composition of aqueous coating material of the present invention is one to be used as mixed with the curing agent. Depending on the curing agent, crosslinking is possible even by drying at room temperature, and it is possible to form a coated film by applying the composition of aqueous coating material and the curing agent. When heating is needed for crosslinking, a coated film may be formed by heating and baking.

The curing agent is a water-soluble or water dispersible curing agent having a functional group reactive with a hydroxyl group or carboxyl group.

The curing agent may, for example, be an isocyanate type compound, a melamine resin, a phenol resin, a xylene resin or a toluene resin. Particularly, an isocyanate type compound is preferred since it is possible to easily obtain a coated film excellent in weather resistance and mechanical property.

The isocyanate type compound is preferably one mechanically dispersed in water or a self-emulsifiable polyisocyanate compound. The self-emulsifiable polyisocyanate compound is a compound which is capable of being emulsified and dispersed in water without an emulsifier.

The polyisocyanate compound to be mechanically dispersed in water may, for example, be an aliphatic polyisocyanate such as hexamethylene diisocyanate; an aromatic polyisocyanate such as m- or p-phenylene diisocyanate, 2,4- or 2,6-tolylene diisocyanate, diphenylmethane-4,4'-diisocyanate, naphthalene-1,5-diisocyanate or 4,4'-diisocyanate-3,3'-dimethyldiphenyl; an alicyclic polyisocyanate such as bis-(isocyanate cyclohexyl)methane or isophorone diisocyanate; a crude polyisocyanate such as crude tolylene diisocyanate or crude diphenylmethane diisocyanate; or a modified polyisocyanate such as carbodiimide-modified diphenylmethane diisocyanate, polyol-modified diphenylmethane diisocyanate or polyol-modified hexamethylene diisocyanate.

Such a polyisocyanate may be a dimer or trimer depending on its type such as a Burette type, an isocyanurate ring type or uretdione type, or it may be a blocked polyisocyanate obtained by reacting an isocyanate group with a block agent.

The block agent may, for example, be an alcohol, a phenol, a caprolactam, an oxime or an active methylene compound.

The above polyisocyanates may be used in combination as a mixture of two or more of them.

As the polyisocyanate, one mechanically dispersed in water is used.

The polyisocyanate to be mechanically dispersed in water is preferably one having a relatively low viscosity.

If an emulsifier is added during the dispersion, more stable dispersion can be obtained. As the emulsifier to be used here, a known one may be used without any particular limitation, but it is not preferred to use one having an ionic, particularly, active hydrogen atom since it undergoes a reaction during the dispersion to increase the viscosity or deteriorate the dispersibility. A non-ionic emulsifier, particularly an emulsifier having a polyoxyethylene chain is preferred.

A blocked polyisocyanate does not usually become cured unless it is heated at a temperature of at least 140° C. Therefore, when curing is desired to be carried out at a temperature lower than such a temperature, it is preferred to use a non-blocked polyisocyanate.

Further, as the self-emulsifiable polyisocyanate compound, it is possible to exemplify a prepolymer obtained by reacting the above polyisocyanate with a hydrophilic polyoxyalkylene.

The hydrophilic polyoxyalkylene is preferably one having at least one isocyanate reactive group and a number average molecular weight in a range of from 200 to 4,000. Particularly preferred is a polyoxyalkylene polyol or polyoxyalkylene monool having a molecular weight in a range of from 300 to 1,500. One having a low molecular weight cannot sufficiently achieve its self-emulsifying property. One having a high molecular weight has a good self-emulsifying property, but its stability in water becomes poor, and its crystallinity becomes high, whereby the storage stability at a low temperature will decrease, and turbidity will be caused.

The oxyalkylene chain in the polyoxyalkylene is preferably one made of entirely or mostly an oxyethylene group from the viewpoint of hydrophilicity.

The reaction of the polyisocyanate with the polyoxyalkylene glycol is carried out in the presence of a catalyst such as a tertiary amine, an alkyl-substituted ethylene imine, a tertiary alkyl phosphine, a metal alkyl acetonate or an organic acid metal salt, and as the case requires, in the presence of a promoter at a temperature of at most 100° C. Further, with respect to the reaction, it is preferred to adjust the amount of remaining isocyanate group to be from 10 to 24 mass %, particularly from 15 to 20 mass %.

If the amount of the remaining isocyanate group is small, the reactivity with the fluorinated copolymer (A) will decrease, such being not preferred. Further, in order to achieve sufficient crosslinking degree, a large amount of the isocyanate compound is needed, which is not preferred since the weather resistance of a coated film will sometimes be adversely affected. If the amount of the remaining isocyanate group is too large, it is difficult to form a stable emulsion, such being not preferred.

The self-emulsifiable isocyanate compound is described in e.g. JP-B-4-15270.

The melamine resin may, for example, be a melamine resin subjected to an alkyl etherification such as methyl etherification, butyl etherification or isobutyl etherification. From the viewpoint of water solubility, a melamine resin wherein at least a part of it is methyl-etherified, is preferred.

The mass ratio of the composition for aqueous coating material to the curing agent in the two-component curable aqueous coating material kit is 50 to 95 mass %/5 to 50 mass %, particularly preferably 65 to 90 mass %/10 to 35 mass %, by a compositional ratio of nonvolatile contents (based on the solid content of the polymer).

EXAMPLES

Now, the present invention will be described in further detail, but it should be understood that the present invention is by no means restricted thereto.

In Examples, "parts" represents "parts by mass" unless otherwise specified.

Evaluation of Storage Stability of Composition for Aqueous Coating Material

Each of aqueous liquids in Synthetic Examples 1 to 5 wherein a fluorinated copolymer is dispersed or dissolved in water, was prepared. Further, a synthetic resin dispersed of dissolved in the aqueous liquid of each of Synthetic Examples 1 to 3, corresponds to the fluorinated copolymer (A) of the present invention. Further, a synthetic resin dispersed or dissolved in the aqueous liquid of each of Synthetic Examples 4 and 5, is a fluorinated copolymer different in the ratio of structural units from the fluorinated copolymer (A) of the present invention.

Synthetic Example 1

As the fluorinated copolymer (B), a fluororesin LUMIFLON flake (chlorotrifluoroethylene/ethyl vinyl ether/cyclohexyl vinyl ether/hydroxybutyl vinyl ether (mol % ratio: 50/15/15/20), hydroxyl group value: 100 mgKOH/g, Mw: 7,000) for a coating material manufactured by Asahi Glass Company, Limited, was dissolved in methyl ethyl ketone (MEK) to obtain a varnish having a solid content of 60 mass %.

To 300 parts of such varnish, 19.3 parts of a 20 mass % succinic anhydride acetone solution and 0.072 part of triethylamine as a catalyst were added, followed by a reaction at 70° C. for 6 hours for esterification. The infrared absorption spectrum of the reaction liquid was measured, whereby the characteristic absorptions (1,850 cm$^{-1}$ and 1,780 cm$^{-1}$) by an acid anhydride observed before the reaction were found to have disappeared, and absorptions of carboxylic acid (1,710 cm$^{-1}$) and ester (1,735 cm$^{-1}$) were observed. The acid number of the fluorinated copolymer after the esterification was 12 mgKOH/g, and the hydroxyl group value was 86 mgKOH/g. According to such values of the acid number and hydroxyl group value, about 2.4 mol % was esterified out of 20 mol % of hydroxybutyl vinyl ether structural units.

Then, to the esterified fluorinated copolymer, 2.73 parts of triethylamine was added, followed by stirring at room temperature for 20 minutes to neutralize a part of the carboxylic acid, and then 180 parts of deionized water was gradually added. As a result, about 1.7 mol % was neutralized out of about 2.4 mol % of esterified structural units having the carboxyl group introduced.

After that, acetone and methyl ethyl ketone were distilled off under reduced pressure. Further, about 90 parts of deionized water was added to obtain an aqueous liquid of Synthetic Example 1 having a solid content concentration of 40 mass %. The obtained raw material composition in Synthetic Example 1, the acid number and hydroxyl group value after the esterification, and mol % of each structural unit obtained from such values are shown in Table 1.

Further, in Table 1, (a1) represents mol % of chlorotrifluoroethylene structural units, (a2) the total mol % of ethyl vinyl ether structural units and cyclohexyl vinyl ether structural units, (a3) mol % of hydroxybutyl vinyl ether structural units, (a4-1) mol % of non-neutralized ones among esterified hydroxybutyl vinyl ether structural units, and (a4-2) mol % of neutralized ones among esterified hydroxybutyl vinyl ether structural units.

Synthetic Examples 2 to 5

Each of aqueous liquids of Synthetic Examples 2 to 5 was obtained in the same manner as in Synthetic Example 1 except that the amount of the acetone solution of succinic anhydride used for the esterification and the amount of triethylamine used for the neutralizing reaction were changed as shown in Table 1. In each of the obtained aqueous liquids of Synthetic Examples 2 to 5, the raw material composition (parts by mass), the acid number and hydroxyl group value after the esterification of the synthetic resin, and mol % of each structural unit obtained from such values are shown in Table 1.

Examples 1 to 3, Comparative Examples 1 and 2

To 100 parts by mass of each of aqueous liquids of Synthetic Examples 1 to 5, components shown in Table 2 were added. Then, it was kept in an oven at 50° C. for 2 weeks, and the storage stability was checked. The results are shown in Table 2. Further, the names of the respective additives in Table 2 represent the following compounds, respectively. Further, the numerical values in Table 2 are represented by parts by mass unless otherwise specified.

DEA: diethylene glycol monoethyl ether acetate
BYK348: a leveling additive (polyether-modified polydimethylsiloxane) manufactured by BYK-Chemie
BYK080: an antifoaming agent (silicon type antifoaming agent) manufactured by BYK-Chemie
TINUVIN 1130: An ultraviolet absorber (condensate of methyl-3-(3-t-butyl-5-(2H-benzotriazol-2-yl)-4-hydroxyphenyl)propionate and polyethylene glycol (molecular weight of 300)) manufactured by Nihon Ciba-Geigy K.K.
Sanor LS765: a light stabilizer manufactured by Sankyo Co., Ltd.

TABLE 2

|  | Ex. 1 | Ex. 2 | Ex. 3 | Comp. Ex. 1 | Comp. Ex. 2 |
| --- | --- | --- | --- | --- | --- |
| Aqueous liquid | Syn. Ex. 1 | Syn. Ex. 2 | Syn. Ex. 3 | Syn. Ex. 4 | Syn. Ex. 5 |
| Acetone | 0 | 0 | 5 | 0 | 15 |
| DEA | 1.5 | 1.5 | 1.5 | 1.5 | 1.5 |
| BYK348 | 0.5 | 0.5 | 0.5 | 0.5 | 0.5 |
| BYK080 | 1 | 1 | 1 | 1 | 1 |
| Sanor LS765 | 0.5 | 0.5 | 0.5 | 0.5 | 0.5 |
| TINUVIN 1130 | 3 | 3 | 3 | 3 | 3 |
| Organic solvent | 0% | 0% | 4.50% | 0% | 12.30% |
| Storage stability | No change | No change | No change | Sedimentation | Sedimentation |

As shown in Table 2, in Examples 1 to 3 wherein the aqueous liquids of Synthetic Examples 1 to 3 were used, respectively, no change was observed although it was kept in an oven at 50° C. for 2 weeks, and thus, it was possible to confirm that the storage stability was excellent.

On the other hand, in Comparative Example 1 wherein the aqueous liquid of Synthetic Example 4 was used and no organic solvent was contained, sedimentation was observed.

TABLE 1

|  | Unit | Synthetic Example 1 | Synthetic Example 2 | Synthetic Example 3 | Synthetic Example 4 | Synthetic Example 5 |
| --- | --- | --- | --- | --- | --- | --- |
| Fluorinated copolymer varnish | Parts by mass | 300 | 300 | 300 | 300 | 300 |
| Succinic anhydride | Parts by mass | 19.3 | 33.8 | 48.2 | 65.9 | 93.2 |
| Acid number | mgKOH/g | 12 | 21 | 30 | 41 | 58 |
| Hydroxyl group value | mgKOH/g | 86 | 79 | 69 | 59 | 40 |
| Triethylamine | Parts by mass | 2.73 | 4.78 | 6.83 | 9.3 | 13.2 |
| (a1) | mol % | 50 | 50 | 50 | 50 | 50 |
| (a2) | mol % | 30 | 30 | 30 | 30 | 30 |
| (a3) | mol % | 17.6 | 15.8 | 14 | 11.8 | 8.4 |
| (a4-1) | mol % | 0.7 | 1.3 | 1.8 | 2.5 | 3.5 |
| (a4-2) | mol % | 1.7 | 2.9 | 4.2 | 5.7 | 8.1 |

In Comparative Example 2 wherein the aqueous liquid of Synthetic Example 5 was used, sedimentation was observed even though the amount of an organic solvent was 12.3%.

Evaluating Water Resistance of Coated Film

Examples 4 to 6

To 100 parts by mass of each of the aqueous liquids of the Synthetic Examples 1 to 3, components shown in Table 3 were added. Then, each of such liquids was spray-coated on a specimen which was obtained by applying an acrylic type emulsion base coating material on a slate plate, and the specimen was dried at room temperature for 2 weeks. Further, the names of the respective additives in Table 3 represent the same compounds in Table 2 except for ones shown below. Further, the numerical values in Table 3 are represented by parts by mass unless otherwise specified.

Bayhydur 3100: a water dispersible type polyisocyanate, manufactured by Sumika Bayer Urethane Co., Ltd.

Water Resistance

Each of specimens of Examples 4 to 6 was immersed in deionized water at room temperature for 2 weeks, and its appearance change was observed. The results are shown in Table 3.

Water Permeability

With respect to each of specimens of Examples 4 to 6, water permeability was measured by a method described in JIS K5400. The results are shown in Table 3.

TABLE 3

|  | Ex. 4 | Ex. 5 | Ex. 6 |
| --- | --- | --- | --- |
| Synthetic Examples | Syn. Ex. 1 | Syn. Ex. 2 | Syn. Ex. 3 |
| Acetone | 0 | 0 | 5 |
| DEA | 1.5 | 1.5 | 1.5 |
| Bayhydur 3100 | 15.2 | 14 | 12.2 |
| BYK348 | 0.5 | 0.5 | 0.5 |
| BYK080 | 1 | 1 | 1 |
| Sanor LS765 | 0.5 | 0.5 | 0.5 |
| TINUVIN 1130 | 3 | 3 | 3 |
| Organic solvent | 0% | 0% | 4.50% |
| Water resistance | No change | No change | No change |
| Water permeability | 0.08 | 0.08 | 0.1 |

As shown in Table 3, in Examples 4 to 6 wherein the aqueous liquids of Synthetic Examples 1 to 3 were used, no change was observed in the water resistance tests, and water permeability was very little. Therefore, it was thus confirmed that by the two-component curable aqueous coating material kit of the present invention, it is possible to form a coated film excellent in water resistance.

Evaluating Glossiness and Weather Resistance of Coated Film

Synthetic Example 6

In 192.9 parts of deionized water, 20.0 parts of an emulsifier NEWCOL 707NF manufactured by Nippon Nyukazai Co., Ltd., 204 parts of 2-ethylhexyl acrylate, 195.8 parts of styrene and 8.2 parts of acrylic acid were added and emulsified by using a homomixer. Into the mixture, 2.04 parts of ammonium persulfate was added, followed by pressurization by nitrogen gas in a glass container and then by degassing to obtain liquid D.

On the other hand, into 1 L a stirrer-equipped glass reactor, 200 parts of deionized water was introduced, followed by pressurization by nitrogen gas and thereby degassing, whereupon the temperature was raised to 80° C. Then, by using a tubular pump, 623.24 parts of liquid D was dropped over a period of 3.5 hours. After that, 1 part of an aqueous solution containing 10 mass % of ammonium persulfate was added thereto, followed by aging for 2.5 hours at a temperature of from 80 to 85° C. Then, it was cooled down to at most 30° C. and neutralized with a 28 mass % aqueous ammonia to obtain an aqueous liquid of Synthetic Example 6 having a solid content concentration of 50 mass %.

Preparation of Pigment Dispersion E 60 parts of titanium oxide pigment CR-90 (manufactured by Ishihara Sangyo Kaisha, Ltd.), 2.9 parts of Disrol H-14N dispersant (manufactured by Nippon Nyukazai Co., Ltd.), 0.2 part of FS antifoam 013B antifoaming agent (manufactured by Dow Corning Corporation), 38 parts of deionized water and 100 parts of glass beads were mixed, and by using a grain mill disperser, the mixture was dispersed, followed by removing the glass beads by filtration to prepare the pigment dispersion E.

Example 7

100 Parts by mass of the aqueous liquid of Synthetic Example 1, 50 parts by mass of the aqueous liquid of Synthetic Example 6, 40 parts by mass of the pigment dispersion E, 1.5 parts by mass of a coalescer DEA, 20.5 parts by mass of a curing agent Bayhydur 3100 and 0.1 part by mass of a polyurethane type associative thickener BERMODOL PUR 2150 manufactured by AKZO Nobel were blended and applied on an aluminum plate (thickness of 1 mm and the surface is chromate treated) by using a film applicator so that a film thickness as dried would be 40 μm, followed by baking at 150° C. for 20 minutes to obtain a specimen. With respect to the appearance of such a specimen, the 60° gloss was 84. By using QUV tester (UC-1 type, QUV-B lamp, manufactured by Electric Devices), when the weather resistance was checked for 1,000 hours with a cycle of irradiation time for 8 hours at 70 degree and wetting time for 4 hours at 50 degree, the gloss retention was 98%, and the weather resistance was thus confirmed to be good.

In Example 7 wherein the aqueous liquid of Synthetic Example 1 was used in combination with other synthetic resins, the glossiness and weather resistance were excellent. Therefore, it was confirmed that by the two-component curable aqueous coating material kit of the present invention, it is possible to form a coated film excellent in glossiness and weather resistance.

Synthetic Example 7

Into a stainless stirrer-equipped autoclave having an inner volume of 200 mL, 19 parts of ethyl vinyl ether, 2 parts of cyclohexyl vinyl ether, 3 parts of hydroxybutyl vinyl ether, 4.5 parts of a macromonomer (EOVE) having a hydrophilic moiety, 60 parts of deionized water, 5 parts of an emulsifier NL-2320 manufactured by Nippon Nyukazai Co., Ltd., 0.35 part of potassium carbonate and 0.1 part of ammonium persulfate were introduced, followed by cooling with ice, pressurizing with nitrogen gas until 3.5 kg/cm², and then degassing. After repeating such pressurizing and degassing twice, the mixture was degassed until 10 mmHg to remove the dissolved gas, and then, 38 parts of chlorotrifluoroethylene was introduced, followed by a reaction at 50° C. for 24 hours.

At the completion of the reaction, the remaining gas was purged to obtain a water dispersion of the fluorinated copolymer.

Further, EOVE is a compound of the following formula, and it has a number average molecular weight of about 500.

$$CH_2=CHOCH_2CH_2CH_2CH_2(OCH_2CH_2)_rOH$$

(wherein r is a positive integer)

Example 8

100 Parts by mass of the aqueous liquid of Synthetic Example 1, 50 parts by mass of the aqueous liquid of Synthetic Example 7, 40 parts by mass of the pigment dispersion E, 3 parts by mass of a coalescer DEA, 20.5 parts by mass of a curing agent Bayhydur 3100 and 0.1 part by mass of a polyurethane type associative thickener BERMODOL PUR 2150 manufactured by AKZO Nobel were blended and applied on an aluminum plate (thickness of 1 mm and the surface is chromate treated) by using a film applicator so that a film thickness as dried would be 40 μm, followed by baking at 150° C. for 20 minutes to obtain a specimen. With respect to the appearance of such a specimen, the 60° gloss was 82, and the weather resistance for 1,000 hours by QUV test had little change, such being preferred.

As shown in Example 8, in Example 8 wherein the aqueous liquid of Synthetic Example 1 was used in combination with the aqueous dispersion of other fluorinated copolymers, the glossiness and weather resistance were excellent. Therefore, it was confirmed that by the two-component curable aqueous coating material kit of the present invention, it is possible to form a coated film excellent in the glossiness and weather resistance.

INDUSTRIAL APPLICABILITY

According to the process for producing a composition for aqueous coating material of the present invention, it is possible to produce a composition for aqueous coating material which has a low content of an organic solvent and presents little burden on the environment, and which is excellent in storage stability. Further, the composition for aqueous coating material is applicable as a two-component curable aqueous coating material kit which presents little burden on the environment and excellent handling efficiency.

The entire disclosures of Japanese Patent Application No. 2006-120464 filed on Apr. 25, 2006 and Japanese Patent Application No. 2007-027081 filed on Feb. 6, 2007 including specifications, claims and summaries are incorporated herein by reference in their entireties.

What is claimed is:

1. A composition for aqueous coating material, which comprises water and a synthetic resin dispersed or dissolved therein, wherein the synthetic resin contains a fluorinated copolymer (A) comprising from 40 to 60 mol % of a structural unit of the formula (a1), from 3 to 50 mol % of a structural unit of the formula (a2), from 4 to 30 mol % of a structural unit of the formula (a3) and to 1.4 to 6 mol % of a structural unit of the formula (a4) provided that the total mol % value of the respective structural units of the formulae (a1), (a2), (a3) and (a4) is from 80 to 100; and which contains no organic solvent or an organic solvent in an amount of at most 10 mass % in the total mass of the composition for aqueous coating material:

$$—CFX^1—CX^2X^3—$$ Formula (a1)

provided that in the formula (a1), each of $X^1$ and $X^2$ which are independent of each other, is a hydrogen atom, a chlorine atom or a fluorine atom, and $X^3$ is a chlorine atom, a fluorine atom or —$CY^1Y^2Y^3$, wherein each of $Y^1$, $Y^2$ and $Y^3$ which are independent of one another, is a hydrogen atom, a chlorine atom or a fluorine atom;

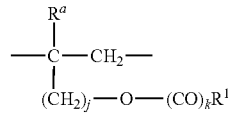

Formula (a2)

provided that in the formula (a2), $R^a$ is a hydrogen atom or a methyl group, $R^1$ is a $C_{1-12}$ alkyl group or a $C_{4-10}$ monovalent alicyclic group, j is an integer of from 0 to 8, and k is 0 or 1;

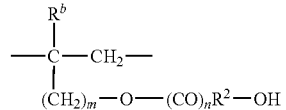

Formula (a3)

provided that in the formula (a3), $R^b$ is a hydrogen atom or a methyl group, $R^2$ is a $C_{1-10}$ alkylene group or a $C_{4-10}$ bivalent alicyclic group, m is an integer of from 0 to 8, and n is 0 or 1; and

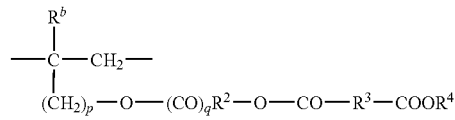

Formula (a4)

provided that in the formula (a4), $R^b$ and $R^2$ are as defined in the formula (a3), respectively, $R^3$ is a $C_{2-10}$ alkylene group or a $C_{4-10}$ bivalent alicyclic group, $R^4$ is a hydrogen atom or —$NHZ^1Z^2Z^3$, wherein each of $Z^1$, $Z^2$ and $Z^3$ which are independent of one another, is a hydrogen atom, a $C_{1-4}$ alkyl group or a $C_{1-6}$ hydroxyalkyl group, provided that at least a part of $R^4$ is required to be —$NHZ^1Z^2Z^3$, p is an integer of from 0 to 8, and q is 0 or 1.

2. A two-component curable aqueous coating material kit which comprises the composition for aqueous coating material as defined in claim 1 and a water-soluble or water-dispersible curing agent.

3. The two-component curable aqueous coating material kit according to claim 2, wherein the water-soluble or water-dispersible curing agent is an isocyanate compound.

4. The two-component curable aqueous coating material kit according to claim 2, wherein the water-soluble or water-dispersible curing agent is a non-blocked isocyanate.

5. The composition for aqueous coating material according to claim 1, wherein the structural unit of the formula (a2) is a structural unit wherein j=k=0, and the structural unit of the formula (a3) is a structural unit wherein m=n=0.

6. The composition for aqueous coating material according to claim 1, wherein the organic solvent is at least one member selected from the group consisting of alcohols, cellosolves, propylene glycol derivatives and ketones.

7. The composition for aqueous coating material according to claim 1, which contains the organic solvent in an amount of at most 3 mass % in the total mass of the composition for aqueous coating material.

8. The composition for aqueous coating material according to claim 1, wherein the composition contains no organic solvent or an organic solvent in an amount of at most 3 mass %.

9. The composition for aqueous coating material according to claim 1, wherein the synthetic resin is at least partially dissolved in the water and the composition comprises no organic solvent or an organic solvent in an amount of at most 4.5 mass %.

10. The composition for aqueous coating material according to claim 1, wherein the fluorinated copolymer (A) comprises polymerized units of chlorotrifluoroethylene, ethyl vinyl ether and hydroxy butylvinyl ether.

11. The composition for aqueous coating material according to claim 1, comprising methylethyl ketone.

12. The composition for aqueous coating material according to claim 1, comprising no organic solvent.

13. The composition for aqueous coating material according to claim 1, wherein the fluorinated copolymer (A) from 2.4 to 6.0 mol % of the structural unit of formula (a4).

14. The composition for aqueous coating material according to claim 1, wherein the composition does not sediment after storage in an oven at 50° C. for 2 weeks.

15. The composition for aqueous coating material according to claim 1, wherein the fluorinated copolymer comprises hydroxy butylvinyl ether as structural units (a4).

16. The composition for aqueous coating material according to claim 15, wherein the composition is stable and no sediment is formed after at least one compound selected from the group consisting of acetone, diethylene glycol monoethyl ether acetate, polyether-modified polydimethylsiloxane, a silicon antifoaming agent, and a condensate of methyl-3-(3-t-butyl-5-(2H-benzotriazol-2-yl)-4-propionate and polyethylene glycol, is added to 100 parts by mass of the aqueous coating material which is then kept in an oven at 50° C. for 2 weeks.

17. The composition for aqueous coating material according to claim 1, wherein the fluorinated copolymer comprises reacted monomer units of (a1) chlorotrifluoroethylene, (a2) ethyl vinyl ether and cyclohexyl vinyl ether, (a3) hydroxy butylvinyl ether and (a4) hydroxy butylvinyl ether esterified with succinic acid.

18. The composition for aqueous coating material according to claim 1, wherein the composition is stable and no sediment is formed after at least one compound selected from the group consisting of acetone, diethylene glycol monoethyl ether acetate, polyether-modified polydimethylsiloxane, a silicon antifoaming agent, and a condensate of methy-1-3-(3-t-buty5-(2H-benzotriazol-2-yl)-4-hydroxyphenyl)propionate and polyethylene glycol, is added to 100 parts by mass of the aqueous coating material which is then kept in an oven at 50° C. for 2 weeks.

19. The composition for aqueous coating material according to claim 1, wherein the fluorocopolymer (A) is present in the synthetic resin in an amount of from 50 to 90 mass %.

* * * * *